United States Patent
Morris

(10) Patent No.: US 7,080,242 B2
(45) Date of Patent: Jul. 18, 2006

(54) INSTRUCTION SET RECONCILIATION FOR HETEROGENEOUS SYMMETRIC-MULTIPROCESSOR SYSTEMS

(75) Inventor: Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 10/324,345

(22) Filed: Dec. 19, 2002

(65) Prior Publication Data

US 2004/0123087 A1 Jun. 24, 2004

(51) Int. Cl.
G06F 15/177 (2006.01)
G06F 9/30 (2006.01)

(52) U.S. Cl. ............... 713/1; 713/2; 713/500; 712/216; 712/226

(58) Field of Classification Search ............ 713/1, 713/2, 190; 712/216, 226
See application file for complete search history.

(56) References Cited

U.S. PATENT DOCUMENTS

| | | | |
|---|---|---|---|
| 5,835,775 A * | 11/1998 | Washington et al. ........ | 717/153 |
| 5,854,913 A * | 12/1998 | Goetz et al. ................ | 712/210 |
| 5,925,125 A * | 7/1999 | Alpert et al. ............... | 712/244 |
| 6,202,095 B1 * | 3/2001 | Beardsley et al. .......... | 709/227 |
| 6,513,057 B1 * | 1/2003 | McCrory .................... | 718/102 |
| 6,584,558 B1 * | 6/2003 | Hammond et al. ......... | 712/244 |
| 6,842,809 B1 * | 1/2005 | Browning et al. .......... | 710/200 |
| 6,895,582 B1 * | 5/2005 | Greve .......................... | 718/1 |
| 2004/0088460 A1* | 5/2004 | Poisner ....................... | 710/260 |
| 2005/0166214 A1* | 7/2005 | Kaulgud et al. ............ | 719/321 |

* cited by examiner

Primary Examiner—Thomas Lee
Assistant Examiner—Vincent Tran

(57) ABSTRACT

In a symmetric multiprocessing system using processors (DP0–DP7) of different capabilities (instruction sets), a processor responds (S11) to a query regarding its capabilities (instruction set) with its "active" capability, which is the intersection of its native capability and a common capability across processors determined (S04) during a boot sequence (13). The querying application (29) can select (S12) a program variant optimized for the active capability of the selected processor. If the application is subsequently subjected to a blind transfer to another processor, it is more likely than it would otherwise be (if the processors responded with their native capabilities) that the previously selected program variant runs without encountering unimplemented instructions.

17 Claims, 2 Drawing Sheets

INSTRUCTION SET RECONCILIATION FOR HETEROGENEOUS SYMMETRIC-MULTIPROCESSOR SYSTEMS

BACKGROUND OF THE INVENTION

The present invention relates to computers and, more particularly, to multiprocessor systems. A major objective of the invention is to provide for high-performance execution of programs in a symmetric multi-processor system using heterogeneous processors.

Much of modern progress has been associated with advances in computer technology. Such advances not only include higher performance processors, but sophisticated multi-processor designs that distribute work among multiple processors for greater overall throughput. There are two distinct approaches to multiprocessor design: asymmetric and symmetric, although systems can incorporate both approaches.

Asymmetric multiprocessor systems typically employ processors with very distinct capabilities: e.g., general-purpose processors versus floating-point processors versus multi-media processors. Accordingly, computing tasks are distributed among processors according to the respective capabilities of the processors.

Symmetric multiprocessors use identical or similar processors. Computing tasks are distributed based on availability and typically without regard to differences in processor capabilities. Ideally, all processors in an SMP ("symmetric multi-processor system") would share the same instruction set. However, in practice, this is not always the case.

SMP systems with processors with different instructions sets, i.e., different "capabilities", are not uncommon. For example, partially populated SMP systems are often purchased for an affordable entry price and future expandability. As purchased, the system might have (e.g., four) identical processors and an addition number (e.g., sixty) of empty processor sockets. Over the course of the system's useful lifetime, the processor manufacturer may have discontinued the original processor in favor of more advanced or more affordable (but more limited) versions of the same processor family. Thus, processors added to the original SMP configuration might provide for additional instructions and might exclude some instructions implemented by the original processors.

For optimal performance, programs are compiled for specific instruction sets. A program optimized for one processor will typically run on another processor from the same family, but less than optimally. If the second processor executes additional instructions, these will not be taken advantage of. If the second processor lacks instructions, the occurrence of the omitted instructions in the compiled program will trigger software substitute routines that implement the same function using only instructions native to the second processor. Typically, such routines have to clear the instruction pipeline, emulate the instruction (using several instructions), and restore the instruction pipeline, so there is a severe penalty involved in handling the unimplemented instruction.

Some programs query a processor regarding its capabilities (i.e., instruction set). The program can then branch to a version optimized for a processor with those capabilities. For example, a program can call different routines depending on whether or not a processor has multimedia extensions or floating-point extensions. This querying is most effective on single-processor systems and on SMP systems in which all processor share the same instruction set.

If several programs or tasks are running at once, the tasks may have to time-share available processing availability. In a multiprocessor environment, a task might be interrupted on one processor and then resumed on another processor. This transfer of a task from one processor to another is typically invisible to the task being transferred. Thus, while an instruction-set query can be used to ensure optimal performance on the processor to which a task is first assigned, this optimal performance can be lost after a task transfer. What is needed is an SMP system that optimizes performance even when its processors employ differing instruction sets.

SUMMARY OF THE INVENTION

The present invention provides a novel processor design and a method of initializing an SMP system that offers improved performance for heterogeneous SMP systems. During system initialization, the processors are polled for their native instruction sets. The native instruction sets are compared to yield a common instruction set. The invention provides that the common instruction can be, but need not be, the intersection of the polled native instruction sets. The common instruction set is then communicated to all the SMP processors, either for adoption or for use in determining an active instruction set for each processor. Typically, a master processor selected early in the initialization process performs the polling, determines the common instruction set, and communicates it to the other processors.

In simpler realizations of the invention, the common instruction set is calculated as the intersection of native instruction sets. In this case, the common instruction set is adopted by each processor as its active instruction set. In these realizations, all processors share the same active instruction set. Processors used in this realization can have a register that initializes with a value reflecting the native instruction set, but is overwritten by a value representing the common instruction set—this value subsequently representing the active value.

In more sophisticated realizations of the invention, the common instruction set need not be an intersection of all the native instruction sets, but may include instructions not implemented in all processors. In such realizations, each local processor determines its active instruction set as a function of its native instruction set and the common instruction set. Preferably, the active instruction set is the intersection of the native instruction set and the common instruction set. In these realizations, typically most, but not necessarily all processors share the same active instruction set.

In the more sophisticated realizations, the active value is a combination of a native instruction set value and a second value. For example, the active value is the intersection of the native instruction set and an instruction set represented in a second register that is initialized to all "1s". This value is ANDed with the native instruction set value, to yield the initial active instruction set value—which is the same as the native instruction set value. When the common value is written to the second register, the active instruction set value changes (unless the native instruction set is the same as the common instruction set). The resulting value is the active instruction-set value.

In the simpler realizations, all processors share the same active instruction set. A program that polls a processor for its instruction set never migrates to a processor that does not implement an instruction found in the active instruction set of the first processor. Thus, performance is not suddenly hindered by unanticipated exceptions due to differing instruction sets.

A disadvantage of the simpler realizations is that one less capable processor can limit the performance in a system having many more capable processors. The more sophisticated realizations permit most processors to operate above the least common capability of the system when this results in a favorable tradeoff in performance. These and other features and advantages of the invention are apparent from the description below with reference to the following drawings.

DETAILED DESCRIPTION

Figure 1:
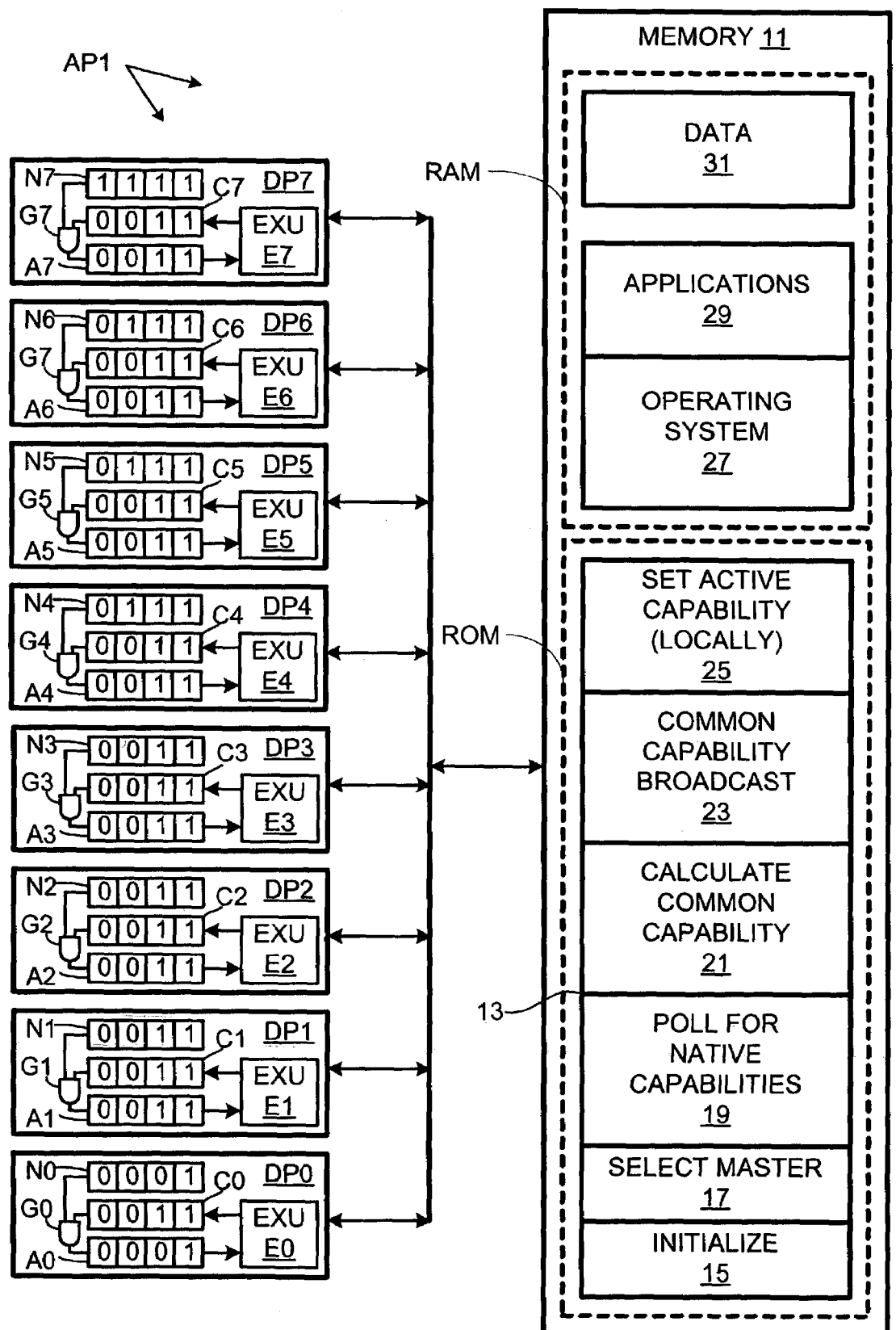
FIG. 1 is a block diagram of a heterogeneous SMP system in accordance with the present invention.

A computer system AP1 comprises eight processors DP0–DP7 and memory 11. Data processor DP0 includes an execution unit E0, a native-capability "register" N0, a common-capability register C0, an active-capability register A0, and an AND gate G0. Execution unit E0 is designed to execute boot, operating system, and application instructions stored in memory 11. Associated with data processor DP0 is an instruction set of native instructions that execution unit E0 can execute. If data processor DP0 encounters an instruction not in its native instruction set, it triggers an exception that typically results in calling an instruction sequence (routine) that implements the function of the instruction using only instructions native to data processor DP0.

Native-capability "register" N0 stores a code indicating the instruction set for data processor DP0. In practice, native-capability "register" is simply a set of electrical nodes hardwired to high and low voltages to indicate 1s and 0s. The native-capability value held by register N0 is ANDed with a common-capability value stored in common-capability register C0 to yield an active-capability value held in active-capability register A0. Upon initialization, common-capability register C0 is filled with 1s. Accordingly, during initialization, active-capability register A0 indicates the native capability of data processor DP0. Later in a boot sequence, a common-capability value can be written to common-capability register C0. At this point, the active capability value stored in register A0 changes to reflect the intersection of the native capability and the common capability.

Data processors DP1–DP7, while not identical to data processor DP0, have components comparable to those illustrated for data processor DP0. Each data processor DP1–DP7 has an execution unit E1–E7, a native-capability "register" N1–N7, a common-capability register C1–C7, an active-capability register A0–A7, and an AND gate G1–G7.

Memory 11 includes both read-only memory ROM and read-write ("random-access) memory RAM. Read-only memory ROM contains a boot program 13 that includes an initialization sequence 15, a master-select sequence 17 for selecting a master processor, a capability-polling sequence 19 for polling processors for their capabilities, a common-capability calculation sequence 21, a common-capability-broadcast sequence 23, and a set-active capability sequence 25 (which involves writing the broadcast common-capability value to the local common-capability registers C0–C7.

Read-write memory RAM includes an operating system 27 that is loaded once boot sequence 13 is completed, as well as one or more applications 29 that can be loaded once operating system 27 is running. In addition, read-write memory stores data 31 to be manipulated in accordance with operating system 27 and applications 29.

Figure 2:
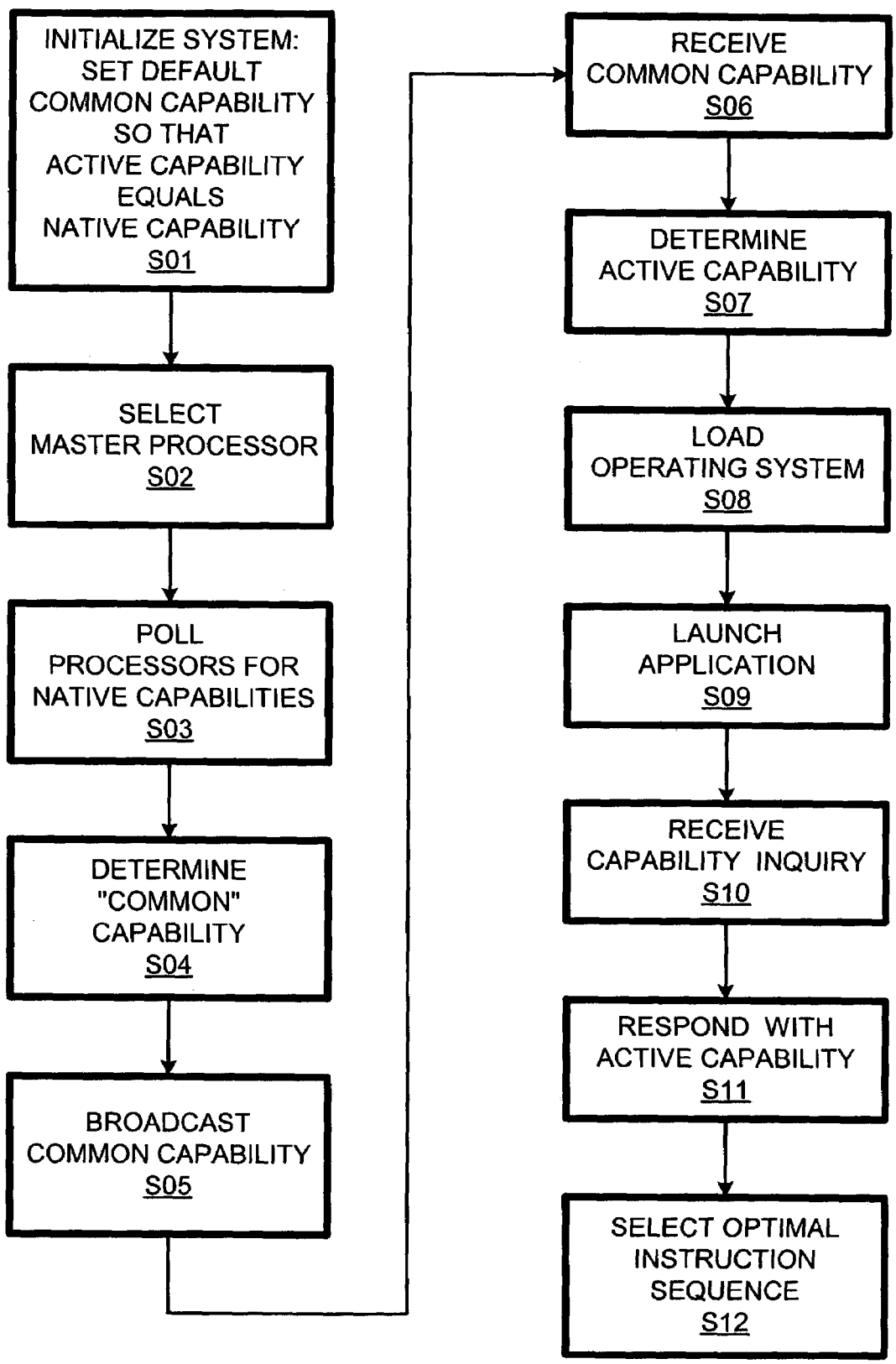
FIG. 2 is a flow chart of a method of the invention practiced using the system of FIG. 1.

A method M1 of the invention practiced using system AP1 is flow-charted in FIG. 2. Initialization step S01 is triggered by a power-on or a system reset. During initialization, each processor accesses instructions at pre-selected ROM memory locations. The initialization instructions can involve checking the system configuration, including identifying the configurations for other processors, memory, and other devices. In addition, default values are set as appropriate in various memories. In the present case, common-capability registers C0–C7 are set to all 1s. This has the effect of forcing the active capability set equal to the native capability for each processor DP1–DP7.

Step S02 involves selection of a master processor. In the present case, the master processor is determined by the processor slot it occupies. In this case, processor DP7 occupies the highest priority processor slot, so it is selected as the master processor.

At step S03, master processor DP7 polls all processors for their capabilities. Each processor DP1–DP7 responds by transmitting the contents of its active-capability register A0–A7. (In an alternative embodiment, the master processor treats itself as a special case, handling the common capability directly and independently of the broadcast.) Since the common capability registers C0–C7 are to have been set to all 1s upon initialization, ANDing the 1s of common capability registers C0–C7 with the respective native capabilities causes the native capabilities to be represented in the active-capabilities registers N0–N7. Thus, each processor DP0–DP7 responds with its native capabilities. At the end of step S03, master processor DP7 "knows" the capabilities of all processors DP0–DP7.

At step S04, master processor DP7 determines a common capability. Generally, the common capability is selected to be equal to or less than the native capability for all or almost all processors in an SMP system. In many cases, this can be an intersection of the capabilities across all processors; the result is then a "lowest-common" processor capability. However, the lowest-common capability may not be optimal, e.g., where one less capable processor determines the common capability for a large number of more capable processors. Accordingly, method M1 permits the setting of a common capability greater than the lowest-common capability.

At step S05, master processor DP7 transmits the common capability to all processors. At step S06, each processor DP0–DP7 then writes the common capability to its common-capability register CC0–CC7. At step S07, each processor DP0–DP7 determines its active capability by intersecting its native capability with the common capability. In system AP1, this involves ANDing the native capabilities with the common capability using AND gates A0–A7.

For any given processor, if the common capabilities are a (possibly exhaustive) subset of the native capabilities, the active capabilities are the same as the common capability. In the uncommon case that the common capabilities include non-native instructions, those instructions are omitted from the active capability. Thus, a processor does not treat as active any common capability not represented among its native capabilities.

Once the boot sequence is completed, operating system 27 can be loaded at step S08. Then, an application 29 can be launched at step S09. The application can be a user application or a thread of a user application. This application is assigned to one of the processors DP0–DP7.

At step S10, application 29 queries the assigned processor for its capabilities. At step S11, the assigned processor responds to the query with its active capability value. At step S12, the application program can then select an instruction sequence (or "version") optimized for the active capabilities of the processor.

In the event of a blind transfer of application 29 to another processor, the previously selected "version" will not be changed. But, in most cases, even if the origination and destination processors have different native instruction sets, their active instructions sets will be the same. Thus, the blind transfer does not result in a mismatch between the selected application version and the processor. If, however, the native capabilities of the destination processor are less than the common capabilities, there will be a significant performance penalty if and when the selected application version presents a non-native instruction to the destination processor. The tradeoffs between selecting a greater common capability and incurring a performance when an exception is triggered are analyzed below.

There are nine "transfer" cases to be considered in evaluating a particular selection for the common capability, the "transfer" being 1) from a processor to which an application is originally assigned, and 2) to a processor to which it is transferred in a manner of which the application is unaware. Both for the original processor and for the transfer processor, there are three possibilities: The native capability of the processor to which an application is assigned can be greater than, equal to, or less than the common capability. The nine cases are listed in Table 1 below.

TABLE I

Nine Combinations of Original and Destination Processors

| Case | Original Processor | Destination Processor | Relative Frequency | Result |
|---|---|---|---|---|
| 1 | N > C | N > C | 16 (25%) | fast |
| 2 | N > C | N = C | 12 (20%) | fast |
| 3 | N > C | N < C | 4 (~6%) | Software |
| 4 | N = C | N > C | 12 (20%) | fast |
| 5 | N = C | N = C | 9 (~14%) | fast |
| 6 | N = C | N < C | 3 (~5%) | Software |
| 7 | N < C | N > C | 4 (~6%) | Slow |
| 8 | N < C | N = C | 3 (~5%) | Slow |
| 9 | N < C | N < C | 1 (~1.5%) | Slow |

N means "native capability";
"C" means "common capability".

In the four cases (1, 2, 4, and 5) where the capabilities of both the original processor and the destination processor meet or exceed common capability, the application optimizes itself for the common capacity. The result is "fast" in that both processors can execute the application's common-capability instructions in hardware.

In the three cases (7, 8, and 9) in which the application is originally assigned to a processor (DP0) having a native capability less than the common capability, performance is slow. The program selects a program sequence optimized for the native capability of the less-capable processor. This selection is optimal until the application is transferred to a faster processor (cases 7 and 8). In those cases, performance can be less than it would have been had the program been originally assigned to the faster processors.

In the two cases (3 and 6) in which the application is transferred from an original processor with capabilities that equal or exceed the common capability to a destination processor that implements a lesser capability, an application could present instructions that the transfer processor cannot execute in hardware. When this occurs, an exception leads to software execution of the unimplemented instructions. Such exceptions exact a high performance penalty.

Cases 3 and 6 can be avoided by setting the common capability to the lowest common capability. But in that case, all but the least capable processor(s) are underutilized all the time. Setting the common capability above the least-common capability involves a tradeoff between: 1) the performance obtained in the absence of an exception, and 2) the likelihood of an exception.

In system AP1, there are three processors (DP1, DP2, DP3) for which the native capabilities match the common capability, four processors (DP4–DP7) for which the native capabilities exceed the common capability, and one processor (DP0) for which the native capability is less than the common capability. Assuming an equal likelihood for all nine cases above, the relative frequencies for the cases are given in the table.

From Table I it is apparent that up to about 7% of the transfers will cause unimplemented instructions to be executed in software. This is a serious performance concern, but it must be balanced against the performance hit that would be involved if the less common native capability of processor DP0 were used as the common capability. Also, the frequency of occurrences for blind transfers in general must be factored into the decision. For system AP1 the performance advantage of operating most of the time at the capability of processors DP1–DP3 more than offsets the penalty exacted by exceptions when an application is transferred to processor DP0. Generally, the greater the differences in processor performance, the smaller the number of total processors required before a common capability is set above the least-common capability increases.

In the illustrated embodiment, system AP1 has one processor partition. In alternative embodiments, the overall system can be divided into partitions, each of which is a multiprocessor system in its own right. In such a system, the blind transfers of concern here only occur between processors in the same partition. In such multi-partition embodiments, each partition can have a different common capability. These and other variations upon and modifications to the described embodiments are provided for by the present invention, the scope of which is defined by the following claims.

What is claimed is:

1. A data processor implementing a native instruction set, said data processor comprising:
   an execution unit for executing program instructions belonging to said native instruction set;
   a capability register that:
      during initialization indicates said native instruction set, and
      in the event said data processor subsequently receives a common-capability value indicating a common instruction set, indicates an intersection of said sets.

2. A data processor as recited in claim 1 wherein said common instruction set is not equivalent to said native instruction set.

3. A data processor as recited in claim 1 wherein said common instruction set is not a subset of said native instruction set.

4. A data processor as recited in claim 1 further comprising:
a hardware representation of said native instruction set;
a writable register for receiving said common-capability value; and
means for computing said intersection.

5. In a method of initializing a multiprocessor system having processors with different instruction sets, the steps of:
polling the processors to determine the respective native instruction sets thereof;
determining a common instruction set that is a non-exhaustive subset of at least one of said native instruction sets; and
communicating said common instruction set to said processors.

6. A method as recited in claim 5 wherein said common instruction set is not a subset of at least one of said native instruction sets.

7. A method as recited in claim 5 further comprising step of, for each of said processors, calculating an active instruction set as a function of the respective native instruction set and said common instruction set.

8. A method as recited in claim 7 wherein, for each of said processors, said active instruction set is the intersection of the respective native instruction set and said common instruction set.

9. A method as recited in claim 8 wherein, for at least one of said processors, said common instruction set is not a subset of the respective native instruction set.

10. A method as recited in claim 5 wherein said common instruction set is the intersection of said native instruction sets.

11. A method as recited in claim 5 wherein said multiprocessor system is a partition of an incorporating multi-partition multi-processor system.

12. A method as recited in claim 5 wherein said processors are symmetrically configured.

13. A symmetric multiprocessor system comprising:
at least three symmetrically-configured data processors, each of said processors having a respective execution unit for executing program instructions belonging to a respective native instruction set, and a respective capability register that
during initialization indicates the respective native instruction set, and
in the event the respective data processor subsequently receives a common-capability value indicating a common instruction set for said symmetrically-configured processors, indicates a respective active instruction set that is a function of said common-instruction set and the respective native instruction set.

14. A symmetric multiprocessor system as recited in claim 13 wherein each of said respective active instruction sets is the intersection of said common instruction set and the respective native instruction set.

15. A symmetric multiprocessor system as recited in claim 13 wherein at least one of said respective active instruction sets is not the intersection of said common instruction set and the respective native instruction set.

16. A symmetric multiprocessor system as recited in claim 13 wherein said common instruction set is the intersection of said native instruction sets.

17. A symmetric multiprocessor system as recited in claim 13 wherein said common instruction set is not the intersection of said native instruction sets.

* * * * *

UNITED STATES PATENT AND TRADEMARK OFFICE
CERTIFICATE OF CORRECTION

PATENT NO. : 7,080,242 B2  
APPLICATION NO. : 10/324345  
DATED : July 18, 2006  
INVENTOR(S) : Dale Morris It is certified that error appears in the above-identified patent and that said Letters Patent is hereby corrected as shown below:

IN THE SPECIFICATION

Column 4, line 16, delete "is" and insert therefor --1s--

Column 4, line 31, delete "is" and insert therefor --1s--

Signed and Sealed this

Sixteenth Day of October, 2007

JON W. DUDAS  
*Director of the United States Patent and Trademark Office*